UNITED STATES PATENT OFFICE.

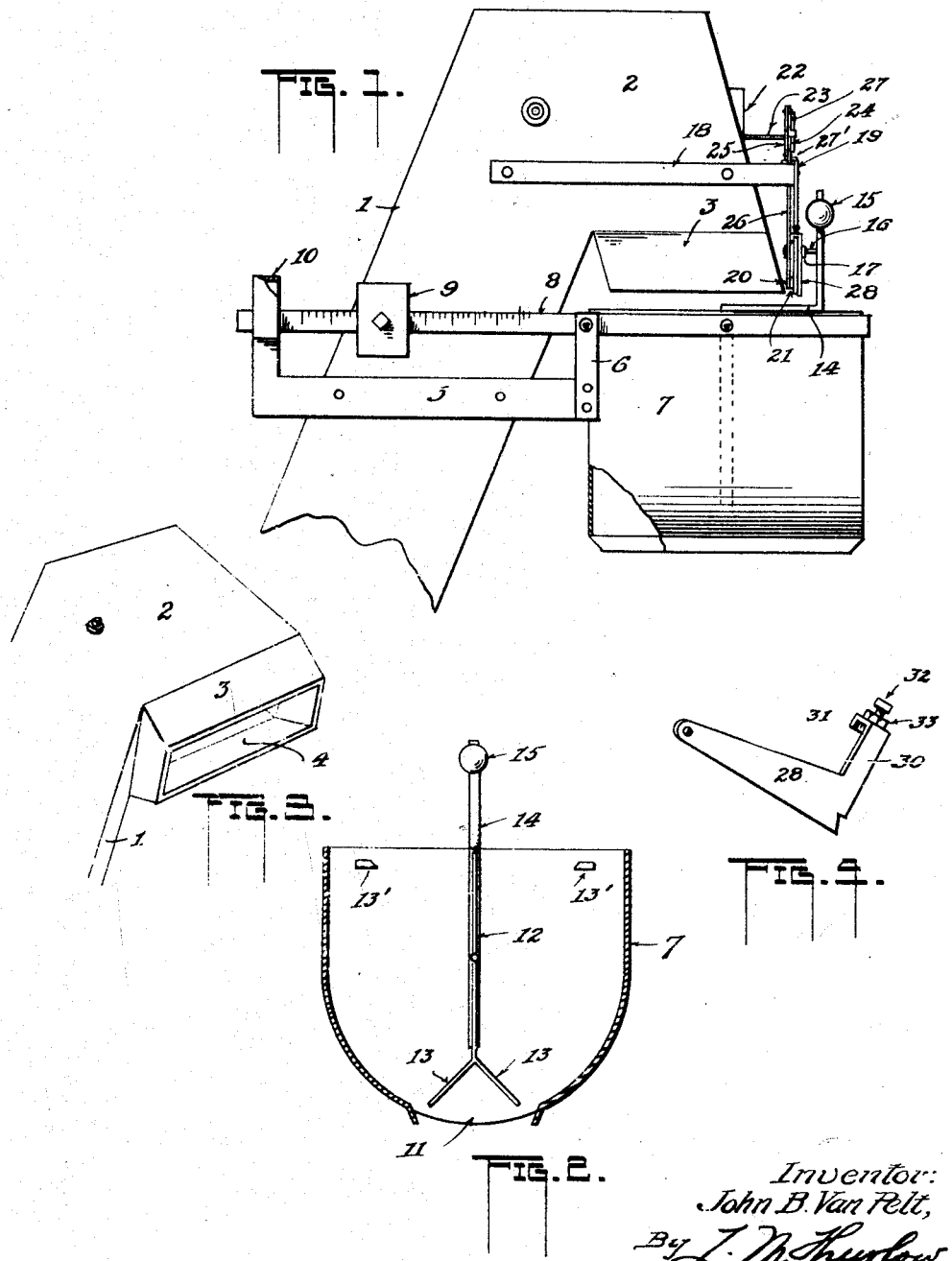

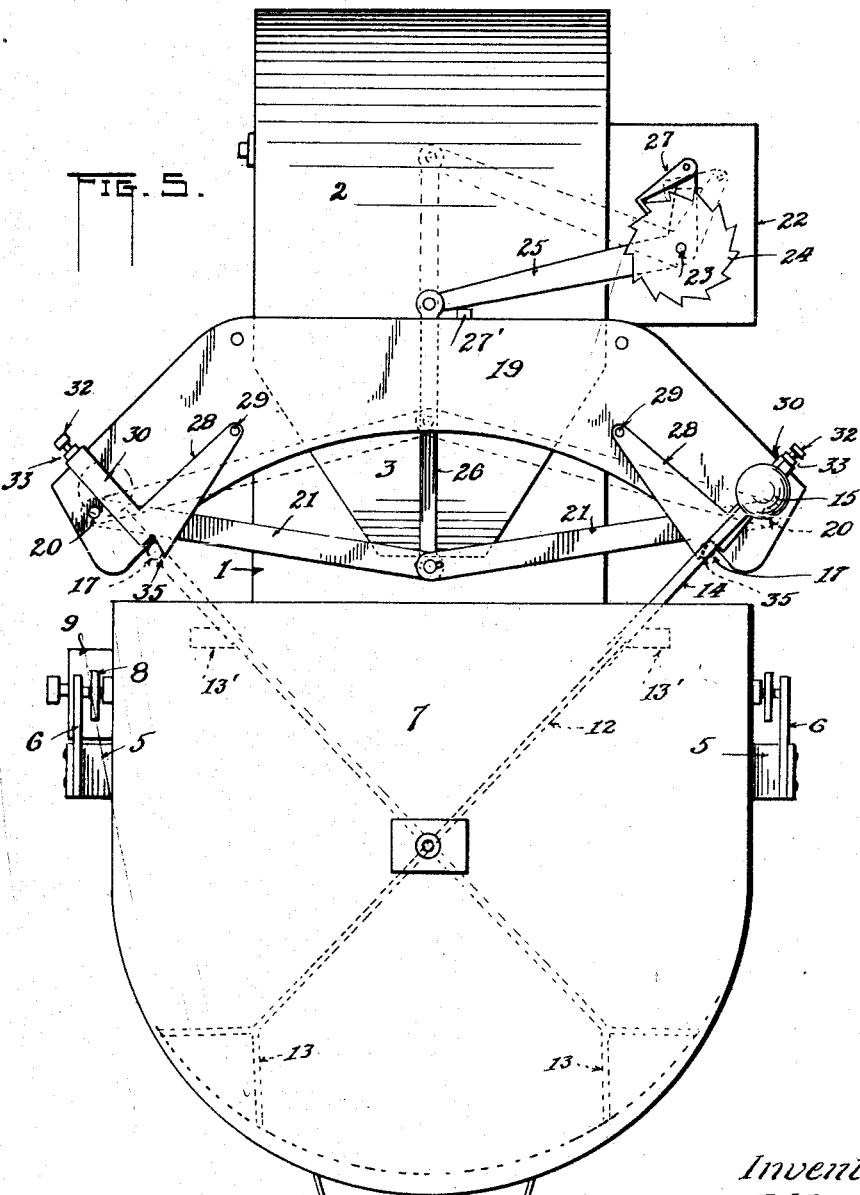

JOHN B. VAN PELT, OF PEORIA, ILLINOIS, ASSIGNOR OF ONE-FOURTH TO FRANK W. VOLKER AND ONE-FOURTH TO ALFRED E. VOLKER, BOTH OF MACOMB, ILLINOIS.

GRAIN-WEIGHER.

1,308,882.      Specification of Letters Patent.      Patented July 8, 1919.

Application filed January 22, 1918. Serial No. 213,126.

*To all whom it may concern:*

Be it known that I, JOHN B. VAN PELT, citizen of the United States, residing at Peoria, in the county of Peoria and State of Illinois, have invented certain new and useful Improvements in Grain-Weighers; and I do hereby declare that the following is a full, clear, and exact description of the invention, which will enable others skilled in the art to which it appertains to make and use the same.

This invention relates to improvements in weighers of that type for use on threshing machines and in other places where a weigher is required to measure and tally quantities of grains and other materials.

The object of the present invention is to provide a novel structure in a grain weigher that will be simple in construction; that will not readily get out of order, and that can be constructed at low cost, and, above all, that will be accurate in its work.

To the end that the invention may be understood I have provided the appended drawings, showing one embodiment of the invention, it being understood that various minor changes may be made therein that will lie within the meaning of the invention and come under the scope of the accompanying claims.

Figure 1 is a side elevation of my improved weigher shown in connection with a grain elevator.

Fig. 2 is a sectional elevation of the weighing hopper.

Fig. 3 shows, in perspective, the head of the elevator and the peculiar form of its discharge opening.

Fig. 4 shows, in perspective, a latch; and

Fig. 5 is a front elevation, on a much larger scale, of the weighing mechanism mounted upon an elevator.

1 is indicative of an elevator and 2 the head thereof, 3 indicating a discharge portion having an outlet 4 of a long narrow form as seen in Fig. 3, which, however, will be described more fully later herein, together with its purpose in connection with the weighing operation.

Attached in any desired manner to the elevator at each side is a member 5. It preferably has an upturned extension 6 for carrying the usual scale beam 8 provided at one end with an adjustable poise 9. At its other end is suspended a hopper 7 in any usual manner providing for free action, the extremity of the beam having the poise being limited in its vertical movement by any desired means such as an extension 10. Said hopper 7, as shown particularly in Fig. 2, has a rounded bottom provided with a discharge opening at 11, and pivoted therein is a centrally disposed valve 12.

The lower end of the valve is provided with a pair of divergent wings 13 as shown in Fig. 2 spaced substantially as shown, the valve and the wings extending the full width of the hopper. The said rounded bottom of the latter is described from a point midway between the walls while the pivot of the valve is preferably located slightly above said point, the purpose of which is that when the valve is in its vertical position the wings will swing entirely free of the bottom so as not to retard the action of said valve. But when the latter swings to either of its extreme positions shown the wings will fit snugly against the inner wall and prevent leakage of grain without binding or interfering with the free action of the valve in any way. 13' indicates spaced stops in the hopper for receiving the said valve in its extreme positions.

14 is an arm arising from the valve and carrying at its upper portion a weight 15, said arm extending down the middle of the valve serving to strengthen it. 16 is an arm extending from and at right angles to the arm 14 in the direction of the elevator head and preferably provided with a friction roller 17.

Secured on the elevator head in any suitable manner, for instance by means of a bracket 18, Fig. 1, is a plate 19. This plate has a curved lower edge described substantially from the pivot of the valve 12. At each extremity of the said plate is pivoted at 20 an arm 21, both arms being pivotally connected at their other ends.

22 is a tally box, or counter, extending from which is a shaft 23 having secured thereon a ratchet wheel 24. 25 is a bell crank pivoted between its ends upon the shaft 23, for example, one of its ends being operatively connected with the described point of pivotal connection of the arms 21 through a link 26, the opposite end of the bell crank being furnished with a pawl 27 adapted to engage and operate the ratchet wheel 24 in a step by step manner for counting purposes. 27' is a suitable stop to receive the long arm of the bell crank for suspending the arms 21 in their normal positions.

28 indicates a latch pivoted to each extremity of the plate 19 at the points 29. Each latch is provided with an extension 30 provided at its extremity with a hook 31 to engage over the upper edge of the plate 19, there being a set screw 32 extending through said extension to engage said plate, a locknut 33 being provided whereby to secure the set screw in any desired adjustment.

The lower edge of each latch lies normally below the lower edge of the plate 19 in the path of arcuate movement of the roller 17.

The operation of the weigher is as follows:

Grain discharged from the head 2 into the hopper will be dropped upon the valve 12. In Fig. 5 the portion of the valve above its pivot lies at the right of the figure, the grain being directed into the division of the hopper at the left, the roller 17 lying behind the projecting portion or abutment of the latch 28.

When sufficient grain has been received to overbalance the poise 9 the hopper will descend until the said roller 17 passes below said latch whereupon the valve being thus free to move by the weight of grain thereon will swing toward the left, which upon passing over center will be aided in its movement to the opposite position by the weight 15 which latter may be adjustable whereby to obtain more or less momentum.

In its travel the roller 17 will engage and lift the toggle formed by the arms 21 thereby moving the counting mechanism one step to record one measure of grain, the toggle falling by gravity to its usual position of rest. As the valve completes its movement the roller engages the latch at the left lifting that member on its pivot which descends by gravity behind the roller after that member has passed it, locking the valve in position until the hopper at the right side has received its weight of grain whereupon the action is repeated.

The latches may be provided each with a notch 35 if desired for receiving the roller, but this is of course not necessary, though it is desirable to have the edge of the latch disposed at such an angle that the pressure of the roller thereon in the direction of the pivot 29 will tend to draw the latch downward or at least prevent it being forced upward to prematurely release the valve. The valve itself could of course be arranged to engage the latches although the roller is preferable in order to reduce friction.

It has been stated that the lower edge of the plate 19 is struck from substantially the pivot of the valve. By this it is meant, merely, that no part of the plate will lie in the path nor interrupt the movement of the roller.

The adjustment of the set screws 32 of the latches 30 provides for equalizing the weights received by the hopper. That is to say, such an adjustment will result in the roller being released from either latch in the same degree of descent of the hopper so that other things being equal the discharge of grain from the hopper will be identical from each compartment.

Preferably as in other weigher structures the scale beam is mounted on knife edges which is likewise true of the hopper at the point of suspension from the scale beam, all of which is common practice.

The discharge opening from the head 2 is preferably a long narrow one, the longest measurement being parallel to the plane of the valve 12. By this means the valve being required to pass beneath a narrow opening, only, will instantly divert a flow of grain to the compartment next to be filled. The opening, since of considerable length as compared with its width, will result in creating quite an extension of the head. To provide for this the arm 14 as shown in Fig. 1 may be carried outward beyond the head and then upward. It will be understood that the narrower the opening is made the more perfect will the act of quickly cutting off the flow of grain by the valve be.

The wings 13 for the valve are provided in order that for instance as shown in the figures the weight of grain will assist in swinging the valve.

The construction of my weigher is exceedingly simple, it cannot readily get out of order and the adjustment of the latches 30 provides for equal weighing, as has been described, assisted by the desired extent to which the discharge opening is contracted. The counting or tallying mechanism may of course be quite light in weight so that it will not retard the movement of the valve.

The structure may, however, be modified in any way desired if found desirable.

One of the advantages of my structure already touched upon is that either latch can be adjusted to trip off at the proper instant in order that equal weights of material can be weighed out. That is to say, if for any reason the weight of grain discharged from one side of the hopper is found not to agree with that delivered from the other side, the proper latch may be adjusted by means of its screw 32 so that both bulks delivered will be identical in weight. One of the causes for any difference in weights may be that of greater wear upon one of the latches during long use, as compared with the other, resulting in tripping at latch too soon so that separate adjustment of the latches is very desirable.

In the claims when I refer to the valve as engaging the latches or the toggle arms 2' I mean either the valve itself or some part carried thereby, in the interest of brevity.

Having thus described my invention, I claim:

1. In a weigher, in combination, a hopper mounted for vertical movement including a poise, a valve pivoted in said hopper adapted to swing to two extreme positions, the pivot of the valve being permanently placed, and a latch at each extreme of travel of the valve and lying in its path, the latter adapted to be disengaged from either latch in its descent with said hopper, and means to separately adjust each latch in the direction of the valve.

2. In a weigher, in combination, a hopper including a scale beam, a valve pivoted centrally in said hopper adapted to swing to two extreme positions and to receive upon either side thereof a stream of grain, and a latch normally in the path of the valve as it moves to each extreme position adapted to be engaged and moved out of the way of the same and to automatically engage behind said valve to hold it in its grain receiving position, and means to adjust each latch relatively to the path of travel of the valve.

3. The combination of a vertically movable hopper including a poise, a valve pivoted in said hopper adapted to swing to two extreme positions, a support above said hopper, a latch pivoted to the support at each extreme of travel of the valve, each lying in the path of a part thereof adapted to be lifted thereby in its travel, and a member for each latch for adjusting it relatively to the path of travel of the said part.

4. In combination with a weighing hopper having a swinging valve, and a counting mechanism, of a pair of arms pivotally connected at one of their ends adapted to have a slight longitudinal movement relatively at their said ends, the opposite ends of the arms being pivotally supported, and a link engaging the said pivotally connected ends and lying substantially at right angles to said arms and their pivots and free to move relatively to said arms and operatively connected to the said mechanism.

In testimony whereof I affix my signature in presence of two witnesses.

JOHN B. VAN PELT.

Witnesses:
ARNOLD G. FERNSTID,
L. M. THURLOW.

Copies of this patent may be obtained for five cents each, by addressing the "Commissioner of Patents, Washington, D. C."